US00RE38303E

(19) United States
(12) Reissued Patent
Askew

(10) Patent Number: US RE38,303 E
(45) Date of Reissued Patent: Nov. 11, 2003

(54) PARTICLE SCREENING SYSTEM

(75) Inventor: Terry R Askew, Dudley (AU)

(73) Assignee: Weatherford Australia Pty. Ltd., Malaga (AU)

(21) Appl. No.: 08/775,825

(22) Filed: Dec. 31, 1996

Related U.S. Patent Documents

Reissue of:
(64) Patent No.: 5,377,846
Issued: Jan. 3, 1995
Appl. No.: 08/037,721
Filed: Mar. 25, 1993

U.S. Applications:
(63) Continuation of application No. 07/821,249, filed on Jan. 10, 1992, now abandoned, which is a continuation of application No. 07/570,380, filed on Aug. 21, 1990, now abandoned.

(30) Foreign Application Priority Data

Aug. 25, 1989 (AU) ..... PJ5978

(51) Int. Cl.[7] ..... B07B 1/49
(52) U.S. Cl. ..... 209/405; 209/399; 209/409
(58) Field of Search ..... 209/327, 395, 209/397, 399, 403, 405, 408, 409, 411, 412

(56) References Cited

U.S. PATENT DOCUMENTS

| | | | | | |
|---|---|---|---|---|---|
| 4,219,412 | A | * | 8/1980 | Hassall | 209/408 |
| 4,661,245 | A | * | 4/1987 | Rutherford et al. | 209/399 |
| 4,871,288 | A | * | 10/1989 | Schmidt et al. | 209/405 X |
| 4,960,510 | A | * | 10/1990 | Wolff | 209/405 |
| 5,049,262 | A | * | 9/1991 | Galton et al. | 209/399 |
| 5,361,911 | A | * | 11/1994 | Waites, Sr. et al. | 209/399 |
| 5,372,261 | A | * | 12/1994 | Galton et al. | 209/408 X |
| 5,377,846 | A | * | 1/1995 | Askew | 209/399 X |
| 5,462,175 | A | * | 10/1995 | Bokor | 209/405 X |

FOREIGN PATENT DOCUMENTS

| | | | | |
|---|---|---|---|---|
| DE | 1186311 | * | 1/1965 | 209/408 |
| DE | 3544752 | * | 5/1987 | 209/405 |
| DE | 3606854 | * | 9/1987 | 209/399 |
| FR | 2380080 | * | 10/1978 | 209/408 |
| SU | 1641469 | * | 4/1991 | 209/405 |
| WO | 8908509 | * | 9/1989 | 209/405 |
| ZA | 745092 | * | 8/1974 | 209/399 |
| ZA | 752229 | * | 3/1976 | 209/399 |

OTHER PUBLICATIONS

Schreckengast, "Spotlight on Screens", Mar. 1989, pp. 48–51.*
Isepren Sales Brochure.*

* cited by examiner

*Primary Examiner*—Tuan N. Nguyen
(74) *Attorney, Agent, or Firm*—Knobbe, Martens, Olson & Bear, LLP

(57) ABSTRACT

A particle screening system is a modular industrial screen system having a number of screen panel modules supported side-by-side and/or end-to-end by a supporting structure assembly. The supporting structure assembly has a number of support bars arranged to support peripheral portions of each screen panel module by way of rail members. The rail members have protrusions which are designed to meet with recesses in the screen panel modules using a snap-engagement.

21 Claims, 2 Drawing Sheets

PARTICLE SCREENING SYSTEM

Matter enclosed in heavy brackets [ ] appears in the original patent but forms no part of this reissue specification; matter printed in italics indicates the additions made by reissue.

This is a continuation of application Ser. No. 07/821,249 filed Jan. 10, 1992, now abandoned, which is a continuation of application Ser. No. 07/570,380 filed Aug. 21, 1990, now abandoned.

BACKGROUND OF THE INVENTION

The present invention relates to particle screening system industrial screens and more particularly to a screen module a plurality of which are retained by a supporting structure.

Currently available screen panels are generally large, heavy and cumbersome requiring considerable time and trouble to dismantle from a supporting structure.

SUMMARY OF THE INVENTION

It is the object of the present invention to provide an improved modular industrial screen system.

There is disclosed herein apparatus comprising:

at least one screen panel module, a supporting structure adapted to support a plurality of said screen panel modules in side-by-side and/or end-to-end abutting relationship, the supporting structure comprising a plurality of supporting bars onto at least one of which is mounted a [fall] *rail* member, said screen panel module(s) comprising mating means adapted to engage with said rail member so as to secure said screen panel module(s) thereto.

BRIEF DESCRIPTION OF THE DRAWINGS

A preferred form of the present invention will now be described by way of example with reference to the accompanying drawings, wherein.

DETAILED DESCRIPTION

Figure 1:
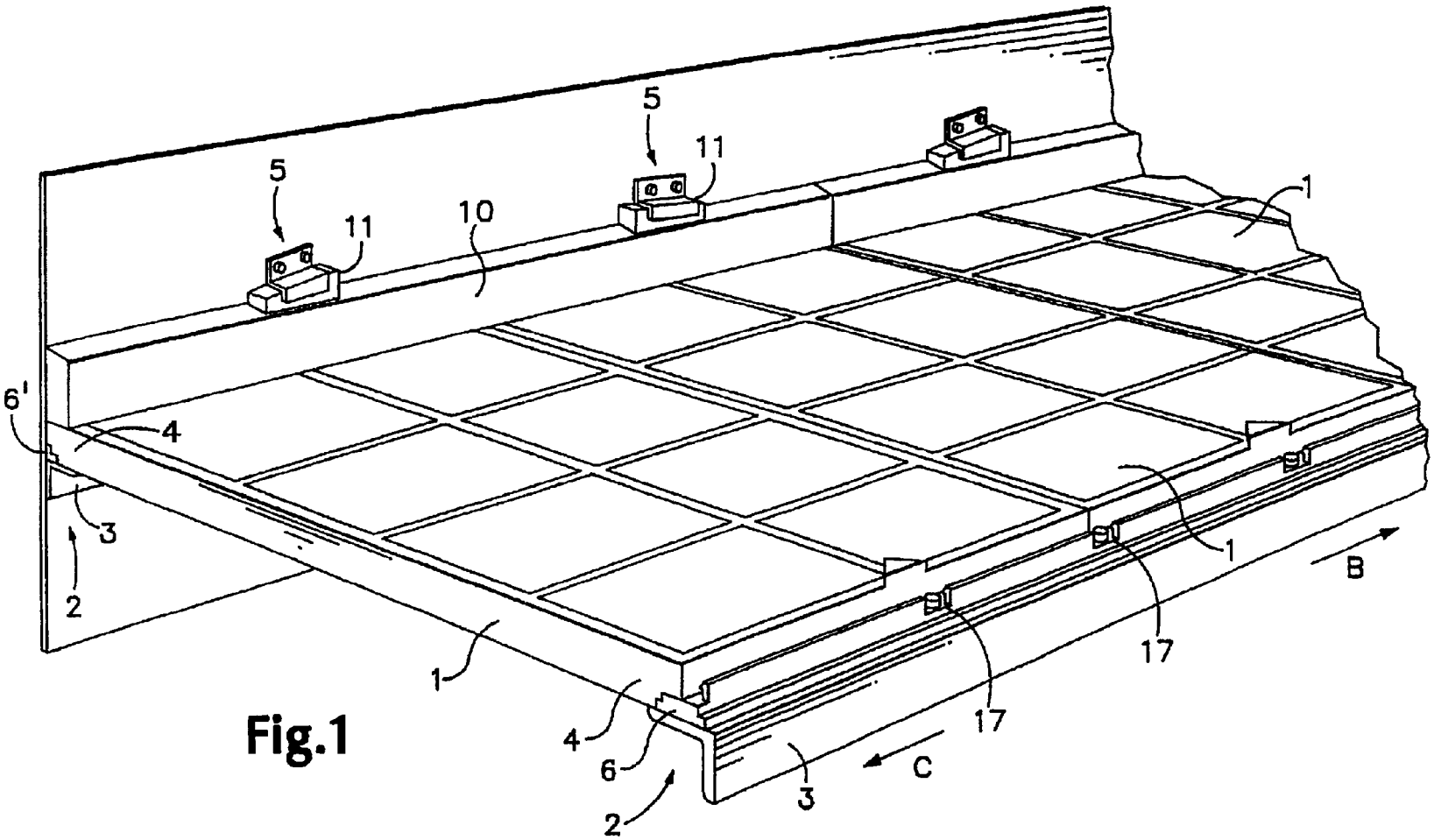
FIG. 1 is a schematic perspective view of a screen panel and support assembly therefor.

In the accompanying drawing, there is schematically depicted a plurality of screen panels 1 supported by support assembly 2. The support assembly 2 includes a plurality of support bars 3 which are arranged to engage at least a portion of the periphery 4 of the panels 1.

The panels may be clamped into position with respect to bars 3. The operation of the optional clamping arrangement 5 is described in the applicant's Australian Patent Application No. 27046/88. Basically, wedge means 11 drive member 10 downwardly onto support bars 3 to firmly secure screen module 1 in place.

Onto support bars 3 are mounted rail members 6 and 6'. Rail member 6 is a central rail adapted to support in side-by-side abutting relationship adjacent screen panels 1. Rail member 6' is a side rail being essentially equivalent to one half of rail member 6.

Figure 2:
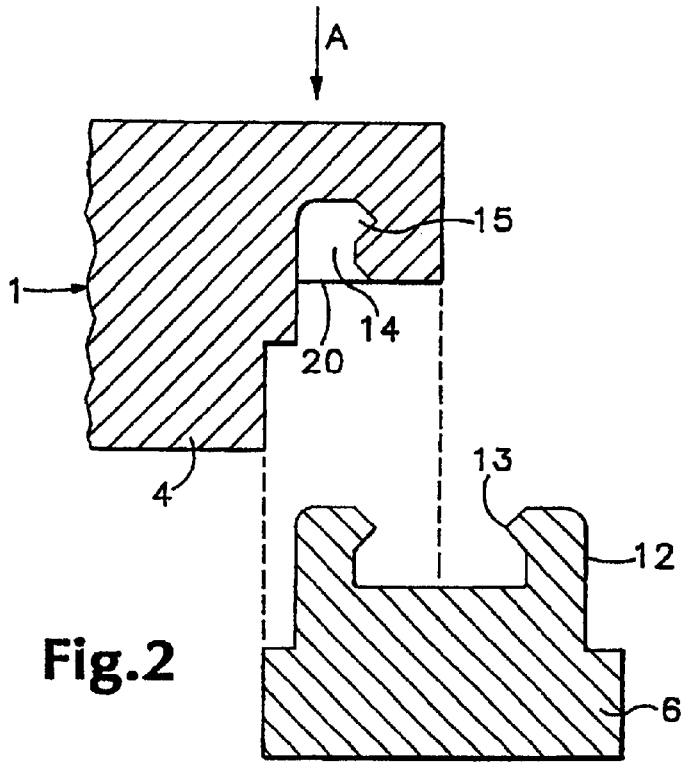
FIG. 2 is an exploded schematic sectional end view of a central support rail and an edge of a screen panel.

Cut-outs 17 are provided in rail member and protuberances 20 in FIG. 2 cooperate with cut-outs 17 [6] to provide means by which movement in directions B and C of panels 1 is prevented.

Figure 3:
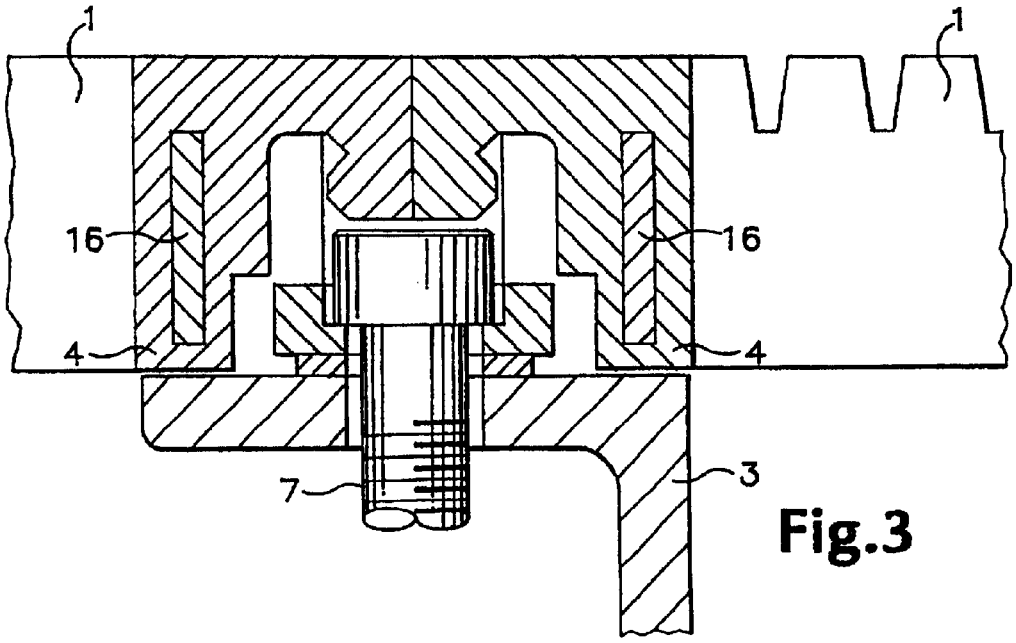
FIG. 3 is a schematic sectional end view of a support member supporting the rail of FIG. 2 and abutting edges of adjacent screen panels.

Rail members 6 may be fastened to support bars 3 by means of bolt 7 as shown In FIG. 3. Bolts 7 are located at various longitudinal locations along track 6.

Referring to FIG. 2, rail members 6 (and 6') are provided with protrusions 12 being designed to mate with recesses 14 in the edge 4 of the screen panel 1. Additionally, protrusion 12 is provided with a lip 13 designed to engage with groove 15 in edge 4 of screen 1 thus providing means by which screen 1 is held firmly in place by track 6.

Further, screen members 1 being formed of plastics material may be reinforced with reinforcing bars 16 extending longitudinally and/or transversely therein.

In use, screen members 1 are [Individually] *individually* snapped onto tracks 6 and 6' by application of a force in the direction of arrow A. As a plurality of screen members replace much larger conventional unitary screen members this process is much easier and safer than otherwise possible. Once one screen member is in place, further screen members 1 are similarly snapped into tracks 6 and 6' to abut with the screen member previously put in place and any adjacent screen members.

It should be noted that minor changes are envisaged by the applicant. For example the specific shape of tracks 6 and the means by which the tracks 6 are anchored to support bars 3 may be altered without departing from the scope of the invention.

What is claimed is:

1. A screening apparatus comprising:

a plurality of elongated support bars which are generally parallel and transversely spaced with respect to each other[:]*;* a plurality of elongated rail members which are mounted on said support bars and which are generally parallel and transversely spaced with respect to each other, each elongated rail member having a pair of transversely-spaced, longitudinally-extending protrusions; and a plurality of screen panel modules mounted on said elongated rail members in side-by-side abutting relationship, each said screen panel module having side portions which extend longitudinally of an adjacent rail so as to be supported thereby, adjacent side portions of adjacent screen panel modules cooperating to secure the screen panel modules to the elongated rail members, each of said mounted screen panel modules being supported only on two sides, each side portion having (a) a longitudinally-extending recess (b) a longitudinally extending resilient [skirt] *peripheral edge portion*, and a longitudinally extending groove projecting from the recess in a direction normal to the recess, each protrusion having a transverse cross-section complimentary to its associated recess and groove and being positioned securely therein so as to be engaged between opposing parts of its associated module with the adjacent [skirt] *peripheral edge* portions of adjacent modules abutting each other to facilitate retaining the modules in position secured to the elongated rail members, each said elongated rail member providing means for preventing movement of said screen panel modules in a longitudinal direction with respect to the longitudinal axis of said rail elongated member.

2. The screening apparatus as claimed in claim 1 wherein the protrusion further comprises a lip over which a groove of said screen panel module [us] is adapted to snap fit.

3. The screening apparatus as claimed in claim 1 wherein the screen panel module and rails are formed of a resilient plastic material to facilitate resilient deformation of the modules on the rails.

4. The screening apparatus as claimed in claim 1 wherein said screen panel module is further provided with reinforcing bars extending longitudinally and/or transversely therein.

5. The screening apparatus as claimed in claim 1, wherein the elongated rail member consists of an elongated base and a pair of parallel protrusions formed integrally therewith, each protrusion comprising a lip adapted to snap fit [over] *into* one of said pair of adjacent screen panel modules.

6. The screening apparatus as claimed in claim 1, wherein the screen panel modules having formed therein a pair of longitudinal recesses each located adjacent to an opposing side of the modules and having grooves formed in said longitudinal recesses, each groove being adapted to snap-engage with a protrusion of each said elongated rail members over and by which the screen panel modules are adapted to be supported.

7. The screening apparatus of claim 1, wherein said sole means for preventing movement of said screen panel modules comprises cut-outs provided in said rail member.

8. The screening apparatus of claim 5 wherein the protrusion comprises a lip over which a groove of said screen panel module is adapted to snap fit.

9. The screening apparatus of claim [1] *6* wherein the screen panel modules are formed of resilient plastics material.

10. The screening apparatus of claim 9 wherein said screen panel modules are further provided with reinforcing bars extending transversely therein.

11. The screening apparatus of claim 5, wherein said means for preventing movement of said screen panel modules comprises cut-outs provided in said rail member.

12. The screening apparatus of claim 6 wherein the protrusion comprises a lip over which a groove of said screen panel module is adapted to snap fit.

13. The screening apparatus of claim 6 wherein the [screen panel modules] *elongate rail members* are formed of resilient plastics material.

14. The screening apparatus of claim 13 wherein said screen panel modules are further provided with reinforcing bars extending transversely therein.

15. The screening apparatus of claim 6, wherein said means for preventing movement of said screen panel modules comprises cut-outs provided in said rail member.

16. The screening apparatus of claim 1 wherein the recesses of each screen panel module have a minimum transverse width which is less than the maximum transverse width of the protrusions so that the protrusions snap fit within the recesses.

17. The screening apparatus of claim [5] *8* wherein the recesses of each screen panel module have a minimum transverse width which is less than the maximum transverse width of the protrusions so that the protrusions snap fit within the recesses.

18. The screening apparatus of claim 6 wherein the recesses of each screen panel module have a minimum transverse width which is less than the maximum transverse width of the protrusions so that the protrusions snap fit within the recesses.

19. The screening apparatus of claim 13 wherein the recesses of each screen panel module have a minimum transverse width which is less than the maximum transverse width of the protrusions so that the protrusions snap fit within the recesses.

20. The screening apparatus of claim 14 wherein the recesses of each screen panel module have a minimum transverse width which is less than the maximum transverse width of the protrusions so that the protrusions snap fit within the recesses.

*21. A screen panel module mountable to a screening apparatus that is configured to receive a plurality of screen panel modules in side-by-side abutting relationship, wherein the screening apparatus has a plurality of elongated support bars which are generally parallel and transversely spaced with respect to each other, a plurality of elongated rail members which are mounted on said support bars and which are generally parallel and transversely spaced with respect to each other, each elongated rail member having a pair of transversely-spaced, longitudinally-extending protrusions, and wherein each said elongated rail member provides means for preventing movement of said screen panel module in a longitudinal direction with respect to the longitudinal axis of said rail elongated member, said screen panel module comprising:*

*two side portions which extend longitudinally of an adjacent rail member so as to be supported thereby such that said mounted screen panel module is supported only on two sides, wherein said side portions are configured such that adjacent side portions of adjacent screen panel modules cooperate to secure the screen panel module to the elongated rail members, and wherein each side portion comprises:*

*a longitudinally-extending recess;*

*a longitudinally extending resilient peripheral edge portion; and*

*a longitudinally extending groove projecting from the recess in a direction normal to the recess, wherein said recess and groove have a transverse cross-section complimentary to its associated protrusion and configured to receive said protrusion securely therein so as to mount said module with adjacent peripheral edge portions of adjacent modules abutting said module to facilitate retaining said module in position secured to the elongated rail members.*

* * * * *